3,544,658
POLYMERIC COMPOSITIONS CONTAINING POLYESTERS, POLYAMIDES AND POLYETHERS

Anthony Julian East and Wendy Denise Thackray, Harrogate, England, assignors to Imperial Chemical Industries Limited, London, England, a corporation of Great Britain
No Drawing. Continuation of application Ser. No. 554,681, June 2, 1966. This application June 5, 1969, Ser. No. 833,881
Claims priority application Great Britain, June 10, 1965, 24,605/65
Int. Cl. C08g 41/04
U.S. Cl. 260—857
8 Claims

ABSTRACT OF THE DISCLOSURE

A process for obtaining fibres of improved substantivity towards acid dyestuffs which involves melt-spinning a molten and intimate mixture of (a) a polyester or copolyester (b) a polyamide or copolyamide and (c) a polyalkylene oxide, the component (b) being present to the extent of less than 50% by weight of the sum of (a) and (b) and the component (c) being present at a level of from 5 to 15% by weight of the sum of (a), (b) and (c). Particularly effective as component (c) are polyethylene oxides of 6,000 to 20,000 molecular weight.

---

This application is a continuation of application Ser. No. 554,681.

The present invention relates to fibres of improved substantivity to acid dyestuffs.

According to the present invention we provide a process for the preparation of fibres by forming an intimate mixture in the molten state of (a) a polyester or copolyester (b) a polyamide or copolyamide and (c) a polyalkylene oxide the compound (b) being present to the extent of less than 50% by weight of the sum of (a) and (b) and compound (c) being present at a level of from 5 to 15% by weight of the sum of (a), (b) and (c) and spinning the mixture into fibres.

We have found that the polyesters and copolyesters made according to the process of our invention have greatly improved substantivity towards acid dyestuffs, such substantivity being resistant to scouring at temperatures of the order of 100° C. The shades produced by dyeing the fibres produced by the process of our invention are fast to washing.

We have found polyethylene oxides of molecular weights from 6,000 to 20,000 to be particularly effective in the process of our invention.

The process of our invention is effective when applied, for example, to polyesters which may be prepared by the reaction of an aromatic dicarboxylic acid together with a glycol, for example ethylene glycol although other methods of preparation may be used, and when applied to copolyesters of the type described but wherein a portion of the dicarboxylic acid and/or a portion of the glycol is replaced, by a second glycol. The resultant polyester or copolyester should not, however, contain polyalkyleneoxy groupings.

Examples of suitable dicarboxylic acids on which the polyesters of our invention may be based are terephthalic acid and 1:2-diphenoxyethane-4:4'-dicarboxylic acid. Examples of suitable glycols are $HO(CH_2)_nOH$, where $n$ is greater than 1 and not greater than 10, and 1:4-bis(hydroxymethyl)cyclohexane.

The copolyesters derive their fibre-forming properties from their basic fibre-forming units, and those suitable for the process of our invention are those of which at least 95% of the units making up the polymer are terephthalate or 1:2-diphenoxyethane-4:4'-dicarboxylate containing units.

The polyamide or copolyamide used in the process of our invention should preferably be fibre-forming and its Viscosity Ratio as measured on a 1% solution in 90% formic acid at 25° C. should not be less than 1.4. As regards the upper limit of Viscosity Ratio satisfactory products have been produced using polyamide of Viscosity Ratio, measured as described hereinbefore, as high as 3.0; higher values would be acceptable provided that a suitable dispersion could be produced.

We have found it advantageous to include in the polyester or copolyester mixture an antioxidant in order to minimize oxidative decomposition of the polyethylene oxide present. Suitable antioxidants are those known to be effective in the protection of fibre-forming polyesters. These may be incorporated at any convenient stage, for example, during preparation of the spinnable mixture, during spinning or thereafter by diffusion.

The polyamide and polyalkylene oxide are immiscible with the polyester or copolyester, and by the term "intimate mixture" we mean that the polyalkylene oxide and polyamide are very finely subdivided and well dispersed through the resultant fibres. Satisfactory results in accordance with our invention have been obtained with dispersions of which the particle size of the dispersed phase in such as to result in fibrils of the dispersed phase in the derived fibres after drawing of from 0.1 to 5 microns, diameter.

We believe that the polyalkylene oxide forms an encapsulating layer about the polyamide which reduces the possibility of reaction between the polyester and the polyamide, the polyester and polyamide should not, therefore, be allowed to react together before adding the polyethylene oxide. The fine state of division and good dispersion can be facilitated by the employment of a dispersing agent. Examples of suitable dispersing agents are polydimethylsiloxanepolyethyleneoxide block copolymers, and alkylphenolethyleneoxide condensate. Such dispersing agent may conveniently be present in an amount up to 2% by weight on the total mixture.

In the case of certain polyesters and copolyesters, for example those containing terephthalate groups, the introduction of, for example, polyethylene oxide segments into the polymer chain causes photo-instability and decreased fastness on exposure to light of the dyeings. In the case of polyethylene oxide in particular, prevention of the incorporation of the polyethylene oxide segments itno the polyester or copolyester chain may be prevented by chemical blocking of the terminal hydroxyls of the polyethylene oxide. In the case of the polyethylene oxides of higher molecular weight, for example 20,000, the content of free hydroxyl groups is so small as to be of negligible importance, and chemical blocking is not normally required.

We believe that the presence of the finely divided and well-dispersed polyalkylene oxide in the polyester or copolyester enhances its hydrophilicity with resultant freer movement of a dyestuff from aqueous solution into the polyester or copolyester. We have found a useful level of polyalkylene oxide to be 7–12% by weight on the total mixture.

Any convenient method may be used for the preparation of the mixture prior to spinning into fibres. For example the additives may be added to the molten polyester of copolyester and thoroughly mixed in particulate form and the mixture then either fed into a screw extruder which completes the mixing, and directly spun into fibres or fed into a suitable apparatus to effect high shear at a temperature above the melting point of the mixture and thereafter formed in particles with cooling. Such particles are then remelted as convenient before forming into fibres.

In order that the nature of our invention may be the more fully understood we give hereinafter some examples of methods in which our invention may be put into practice. These examples, in which all parts and percentages are by weight, are not intended to limit the scope of our invention in any way.

EXAMPLE 1

Poly(ethylene terephthalate) (100 parts) polyethylene oxide of molecular weight 20,000 (10 parts) undelustred poly(hexamethylene adipamide) (10 parts) and the antioxidant 2:2'-dihydroxy; 3:3'-bis($\alpha$-methylcyclohexyl)-5'-dimethylphenylmethane (0.5 part) were melt-blended at 300° C. under an atmosphere of nitrogen in a 2 inch diameter glass tube using a double-helical stainless-steel mixer rotating at 30 r.p.m. The resultant mixture was solidified and reduced to a powder which passed a 30 mesh to the inch sieve. The product had Viscosity Ratio 1.85 as measured in orthochlorophenol at 25° C. as a 1% solution. The powder was melt-spun at 282° C. through a 5 hole spinneret with hole size 0.015 inch at a throughput of 4.6 g. per minute using a wind-up speed of 3,000 feet per minute. The resultant filaments were drawn over a pin at 75° C. and a plate at 160° C. using a draw ratio of 4.0:1. The resultant fibres were white, lustrous and of pleasing handle. They had a tenacity of 3.0 grams per denier, extensibility of 12% and initial modulus of 73 grams per denier.

Hanks of the fibre (0.5 g.) were dyed at the boil for 1 hour from infinite dyebaths of the following composition:

Dyestuff—0.1 g.
Glacial acetic acid—0.5 ml.
Distilled water—100 g.

Dyeings were carried out using each of the dyestuffs

C.I. Acid Red 88,
C.I. Acid Blue 78, and
C.I. Acid Green 25.

The dyeings were repeated in the presence of 0.5 g. of the sodium salt of orthophenyl phenol (o.p.p.) as dyeing assistant. The shades obtained are given in Table 1.

TABLE 1

| Dyestuff | With o.p.p. | Without o.p.p. |
|---|---|---|
| C.I. Acid Red 88 | Medium shade | Medium shade. |
| C.I. Acid Blue 78 | do | Do. |
| C.I. Acid Green 25 | do | Do. |

All of the shades obtained were fast to scouring.

EXAMPLE A

Under exactly similar conditions to those of Example 1, poly(ethylene terephthalate) fibres containing 10% of poly(hexamethylene adipamide) but without the other additives when subjected to dyeing as described in Example 1 were hardly stained without the carrier, and dyed to only pale shades with the carrier.

EXAMPLE 2

Poly(ethylene terephthalate) (100 parts), polyethylene oxide of molecular weight 20,000 (10 parts), the antioxidant used in Example 1 (0.5 parts) and poly(hexamethylene adipamide) copolymer containing 4 mol percent of N-(2'-aminoethyl) piperazine units (10 parts) were melt-blended exactly as in Example 1. The blend had a Viscosity Ratio of 1.79 as measured in 1% orthochlorophenol at 25° C. The mixture was melt-spun at 282° C. at a throughout rate of 4.6 g. per minute using a wind-up speed of 4,000 feet per minute. The resultant filaments were drawn over a pin at 75° C. and a plate at 160° C. using a draw ratio of 3.5.

Hanks of the fibre (2.0 g.) were dyed at the boil from 6% dye-on-fibre dyebaths for one hour with mechanical agitation at a pH of 3.5 using a goods-to-liquor ratio of 1:75. Deep, bright shades which were fast to washing were obtained with each of the dyestuffs C.I. Acid Red 88, C.I. Acid Blue 78 and C.I. Acid Green 25.

EXAMPLE 3

Polyethylene terephthalate (100 parts) polyethylene glycol of molecular weight 20,000 (10 parts), the antioxidant used in Example 1 (0.5 part) and the copolyamide as used in Example 2 (20 parts) were melt blended as in Example 1. The product had a Viscosity Ratio of 1.69 as a 1% solution in orthochlorophenol at 25° C. The mixture was melt spun at 286° C. at a throughput of 5.8 g./minute and a windup speed of 4,000 feet per minute. The filaments were drawn over a pin at 80° C. and a plate at 185° C. using a draw ratio of 3.5. Hanks (2.0 g.) were dyed at the boil from 6% dye-on-fibre as in Example 2. Deep, washfast shades were obtained using each of the dyestuffs C.I. Acid Red 88, C.I. Acid Blue 78 and C.I. Acid Green 25.

EXAMPLE 4

(a) Preparation of poly [(sebacoyl N-(2-aminoethyl) piperazine)]

Poly [sebacoyl N-(2-aminoethyl)piperazine] was prepared by heating at 176° C. for one hour a mixture of sebacic acid (200 parts) and N-(2-aminoethyl)piperazine (129 parts). The polycondensation was concluded by heating at 222° C. for four hours, gradually reducing the pressure over the last three hours to 10 mm. mercury. The product was pale yellow, s.p. 110° C., Viscosity Ratio 2.1 as a 1% solution in 90% formic acid at 25° C.

(b) Preparation of modified polyester

A melt blend of this polyamide (10 parts) with polyethylene terephthalate (100 parts), polyethylene oxide, M.W. 20,000 (10 parts) and antioxidant as in Example (1) (1 part) was prepared by mixing under dry nitrogen at 300° for ten minutes as in Example 1. The blend (which was a pale cream colour) had a Viscosity Ratio of 1.60 as a 1% solution in orthochlorophenol at 25° C.

The dried powdered blend was melt spun at 280° C. through a 5 hole spinneret each hole being of 0.015 inch diameter, at a throughput of 5.8 gm./min. and a windup speed of 2000 feet per minute. The spun yarn was plied up and drawn at a draw ratio of 5.0 over a pin at 85° C., and a plate at 185° C. to give a ten filament yarn of 3.1 denier per filament.

The drawn fibres were dyed at the boil from 6% dye-on-fibre dyebaths for one hour at pH 3.8, then scoured for twenty minutes at 60° C. in a 0.1% sodium cetyl/oleyl sulphate/0.2% sodium carbonate solution. Very deep shades were obtained with the following dyestuffs C.I. Acid Red 88, C.I. Acid Red 266, C.I. Acid Green 25, C.I. Acid Orange 7, C.I. Acid Blue 78 and C.I. Acid Blue 138.

The dyebaths were nearly exhausted and colourimetric analysis of the fibres dyed with C.I. Acid Red 266 by dissolving them in hot benzyl alcohol and measuring the optical density of a 0.1% solution at 520 millimicrons on a Unicam S.P. 500 spectrophotometer (Unicam is a registered trademark) gave a dye-uptake figure of 5.7 mg./gm. Fibres dyed with the same dyestuff were exposed to a xenon arc for one week and comparison with standard samples indicated a light fastness of four on the International Blue Scale.

EXAMPLE 5

(a) Preparation of poly(sebacoyl NN'-bis(3-aminopropyl)piperazine)

Sebacic acid (200 parts) and NN'-bis(3-aminopropyl)-piperazine (200 parts) were heated at 176° C. in a p-cymene vapour bath for one hour under a steam of nitrogen. To complete the evolution of water the reaction was continued at 222° C. in a methyl salicylate vapour bath for three hours. During this stage the pressure was reduced slowly to 12 mm. mercury over the first thirty minutes, and the melt rapidly grew viscous.

Finally the very viscous polymer melt was extruded and cooled to give a faintly opaque pale yellow product. The polyamide had a softening point of about 150° C. and a viscosity ratio as a 1% solution in 90% formic acid at 25° C. of 2.5.

(b) Preparation of modified polyester

A mixture of undelustred polyethylene terephthalate chip (100 parts) of Viscosity Ratio 1.80 (as measured in 1% orthochlorophenol solution at 25° C.) polyethylene oxide, molecular weight approx. 20,000 (8 parts), poly-(sebacoyl NN'-bis(3-aminopropyl)piperazine) as prepared above (10 parts) and antioxidant as used in Example 1 (1 part) were melt blended at 300° C. under nitrogen as in previous examples. The molten polymer mixture was extruded, cast and chipped. It had a Viscosity Ratio as a 1% solution in orthochlorophenol at 25° C. of 1.75. Before blending, the polyamide was thoroughly dried in a vacuum oven at 90° C./12 mm. mercury for five hours, and the polyethylene oxide likewise dried in a vacuum desiccator over phosphoric oxide.

The chipped polymer blend was melt spun at 270° C. through a five-hole spinneret of hole diameter 0.015 inch at a throughput of 2.0 gm./min. and a windup speed of 1000 feet per minute. The spun yarn was drawn at a draw ratio of 5:1 over a pin at 85° C. and a plate at 160° C., to give lustrous fibres of pleasant handle. The fibres were tinged with a very pale pink colour due to the presence of the antioxidant. They had a tenacity of 3.0 gm. per denier, a 2% secant modulus of 78 g.p.d. and extensibility at break 4.4%. The glass-rubber transition temperature of the fibres as measured in water (total immersion) by the dynamic loss method was >100° C.

Dyeings were carried out at the boil for one hour from dyebaths at pH 3.8 with mechanical agitation. The results are set out in Table 2. In all cases deep intense shades resulted after scouring.

TABLE 2

| Dyestuff | Percent bath | Exhaustion |
|---|---|---|
| C.I. Acid Red 1 | 6 | Complete. |
| C.I. Acid Red 37 | 6 | Do. |
| C.I. Acid Red 88 | 6 | Do. |
| C.I. Acid Orange 7 | 6 | Almost. |
| C.I. Acid Orange 89* | 6 | Do. |
| C.I. Acid Yellow 7 | 6 | Do. |
| C.I. Acid Green 25 | 6 | Complete. |
| C.I. Acid Blue 78 | 6 | Do. |
| C.I. Acid Blue 168* | 6 | Almost. |
| C.I. Acid Violet 34 | 6 | Complete. |
| C.I. Acid Black 58 | 12 | Do. |
| C.I. Acid Red 80 | 6 | Do. |

*Premetallised.

EXAMPLE 6

Poly(adipoyl NN'-bis(3-aminopropyl)piperazine) was prepared as in the preceding example from 100 parts NN'-bis(3-aminopropyl)piperazine and 73 parts adipic acid. The polyamide had Viscosity Ratio 2.84 as a 1% solution in 90% formic acid at 25° and a softening point of 185° C.

A melt blend of 100 parts polyethylene terephthalate, 8 parts polyamide, 8 parts polyethylene oxide (M.W. 20,000), 0.5 part antioxidant, as used in Example 1, and 0.5 part diphenyl 2-ethyhexyl phosphite was prepared as in the preceding example. The blend had a Viscosity Ratio of 1.72 as a 1% solution in orthochlorophenol at 25° C. The blend was spun at 272° through a 5 hole spinneret of hole diameter 0.015 inch to give a spun denier of 11.2 d.p.f. The yarn was plied up and drawn over a pin at 85° and a plate at 165° to give a 15-filament yarn of 2.8 d.p.f. i.e. Draw Ratio 4.0:1. The yarn had tenacity 3.5 g.p.d., 2% secant modulus 78.0 g.p.d. and extensibility 14.5%.

The yarn dyed to deep shades and gave complete dyebath exhaustion at the boil from 6% dye-on-fibre baths according to Example 2 of the following acid (wool) dyestuffs at pH 3.8 C.I. Acid Green 25, C.I. Acid Blue 78, C.I. Acid Red 1, C.I. Acid Red 88 and C.I. Acid Orange 7.

The presence of the diphenyl 2-ethylhexyl phosphite reduced the tendency of the yarn to yellow and gave a product of excellent colour.

EXAMPLE 7

This is to illustrate the effectiveness of a phosphite stabilizer.

Two identical melt blends of polyethylene terephthalate (100 parts), polyamide as prepared in Example 5 (8 parts) polyethylene oxide of M.W. 20,000 (8 parts) and antioxidant as used in Example 1 (0.5 part) were prepared, except that one of the blends was added 0.5 part diphenyl 2-ethylhexyl phosphite as a stabilizer. Both blends were spun and drawn to yarns under identical conditions as in Example 5 and irradiated in a xenon arc. The unstabilized yarn had yellowed noticeably after 48 hours, whereas that containing phosphite stabilizer was unaffected after 252 hours.

EXAMPLE 8

A 1:1 molar copolyamide was prepared by heating together at 176° C. adipic acid (73 parts), 60% aqueous hexamethylene diamine (45 parts) and redistilled N-(2-aminoethyl)-piperazine (31 parts) under a stream of nitrogen for 1½ hours until all the water had been evolved. The polymerisation was completed by heating at 222° C. under a vacuum of 12 mm. mercury. On extrusion the polymer solidified to a pale yellow resin s.p. 165° C. Its Viscosity Ratio as a 1% solution in formic acid (90%) at 25° C. was 1.90.

The polyamide was ground and dried for 5 hours at 80° in vacuo. Ten parts polyamide were melt blended with polyethylene terephthalate (100 parts) of Viscosity Ratio 1.85 as a 1% solution in orthochlorophenol at 25° C. and polyethylene glycol M.W. 20,000 (10 parts) and antioxidant as used in Example 1 (0.5 part) at 300° C. The extruded melt solidified to a pale cream product of Viscosity Ratio 1.64 as measured on a 1% solution in orthochlorophenol.

The blend was melt-spun at 275° through a 5 hole spinneret of hole diameter 0.015 inch at a windup speed of 2000 feet per minute. The filaments were drawn at 4.5:1 over a pin at 85° and a plate at 165° giving lustrous fibres of good colour, tenacity 4.5 g.p.d., 2% secant modulus 94.0 g.p.d., extensibility 10.0%.

Using the method of Example 2, the fibres dyed to deep shades and exhausted 6% dye-on-fibre baths of the following acid (wool) dyes:

C.I. Acid Red 88, C.I. Acid Orange, 7
C.I. Acid Yellow 70, C.I. Acid Green 25
C.I. Acid Blue 78, C.I. Acid Red 80

EXAMPLE 9

Poly(suberoyl N-(2-aminoethyl)piperazine) was prepared by heating N-(2-aminoethyl)piperazine (43 parts) and suberic acid (58 parts) at 160° for four hours, applying a vacuum of 12 mm. mercury for the last two hours. The product had Viscosity Ratio 1.73 (1% solution in 90% formic acid).

A melt blend of this polyamide with polyethylene terephthalate, polyethylene glycol and antioxidant was prepared exactly as in Example 8 and had a Viscosity Ratio of 1.65 as a 1% solution in ortho-chlorophenol. The mixture was melt-spun at 272° C. as in the preceding Example, drawn over a pin at 85° C. and a plate at 165° C. to give a draw ratio of 4.0:1. Using the method of Example 2, the fibres dyed to deep shades and exhausted 6% dye-on-fibre baths of the following acid dyes: C.I. Acid Red 88, C.I. Acid Orange 7, C.I. Acid Green 25 and C.I. Acid Blue 78.

EXAMPLE 10

A 1:1 molar copolyamide was prepared by heating together at 176° C. under a stream of nitrogen caprolactam (28.5 parts), N(2-aminoethyl piperazine) (32.25 parts) and adipic acid (36.5 parts) until all the water had been evolved. After allowing to react for two more hours at 222° C. under a pressure of 12 mm. of mercury, the product was extruded as a clear yellow resin of Viscosity Ratio 1.5 in 90% Formic acid (1% solution at 25° C.).

A melt blend of the copolyamide with poly(ethylene terephthalate), polyglycol and antioxidant was prepared exactly as in Example 8 and melt spun at 275° C. to give lustrous fibres which were drawn as in Example 8. They likewise exhausted 6% dye-on-fibre dyebaths of the six dyestuffs listed in Example 8 giving deep washfast shades.

EXAMPLE 11

A copolyamide was prepared by heating together at 176° C. under nitrogen azelaic acid (65.4 parts), pure hexamethylenediamine (23.2 parts (⅔ mole)), and N(2-aminoethyl)piperazine (12.9 parts (⅓ mole)). The polymerisation was concluded at 222° C. under 12 mm. pressure to give a product Viscosity Ratio 2.1 (1% solution in 90% formic acid at 25°) softening point approximately 145° C.

A melt blend of the polyamide with poly(ethylene terephthalate), polyglycol and antioxidant prepared as in Example 8 spun well at 275° C. and the fibres were drawn at a ratio of 4:1 over a pin at 85° C. and a plate at 140° C. The drawn fibres dyed to deep shades under the conditions of Example 8.

EXAMPLE 12

This example illustrates how the polyethylene glycol and the polyamide may be advantageously blended together in the molten state first before blending with the polyester.

The following ingredients were heated at 176° C. in a stream of nitrogen:

| | Parts by volume |
|---|---|
| N-(2-aminoethyl)piperazine | 14.5 |
| 60% hexamethylene diamine | 22.5 |
| Adipic acid | 32.7 |
| Polyethylene oxide M.W. 20,000 | 50.0 |
| Antioxidant | 0.5 |

When all the water had been removed the mixture was heated and agitated at 222° C. under a pressure of 0.2 mm. of mercury until it was a very viscous homogeneous emulsion. On extrusion the molten mass solidified to a hard opaque yellow mass, softening point about 120° C. On standing in water for several hours a sample swelled and then disintegrated leaving a suspension of very fine particles of polyamide, indicating that the polyethylene oxide was the continuous phase. Microscopic examination of the blend showed that the polyamide was very evenly and finely dispersed as particles between 5 and 20µ in diameter.

100 parts poly(ethylene terephthalate) chip were melted at 290° C. and stirred with 20 parts of this blend. The mixture rapidly dispersed and was extruded after ten minutes, giving a product of Viscosity Ratio 1.65 as a 1% solution in orthochlorophenol at 25° C. The blend spun well at 275° C. and gave very homogeneous spun fibres. After drawing over a pin at 90° C. and a plate at 150° C. to a draw ratio of 4:1, the fibres had tenacity 3.0 g.p.d., a 2% secant modulus of 65 g.p.d. and an extensibility of 5%. The fibres dyed very deeply under the conditions of Example 8 and exhausted 6% dye-on-fibre dyebaths of C.I. Acid Red 88, C.I. Acid Blue 138 and C.I. Acid Green 16.

EXAMPLE 13

A dried blend of polyethylene terephthalate chip of Viscosity Ratio 1.85 as measured on a 1% solution in orthochlorophenol at 25° C. (1000 parts) and chipped polyamide/polyglycol dispersion prepared as in Example 12 (160 parts) having a Viscosity Ratio of 1.9 (as a 1% solution in 90% formic acid at 25° C.) was melt spun using a ⅝" screw-feed melt spinning machine under the following conditions:

Screw speed—25 r.p.m.
Screw barrel temperature—270° C.
Screw pressure—200 p.s.i.
Spinning temperature—275° C.
Spinning pressure—600 p.s.i.
Throughput—8.3 gm./min.
Spinneret—5 hole, 0.015"
Sand pack—36/60 mesh
Windup speed—3000 f.p.m.

During the spinning process a spin-finish containing a 5% aqueous dispersion of a long chain fatty alcohol/ethylene oxide condensate was applied to the threadline by means of a lick-roll revolving at 5 r.p.m. The spun yarn was plied up to 15 filaments and drawn to a draw ratio of 4.5:1 over a pin at 75° C. and a plate at 110° C. at a draw speed of 360 f.p.m. (feet per minute) to give a lustrous soft-handle yarn having the following properties:

Tenacity—3.3 g.p.d.
2% secant modulus—96 g.p.d.
Extensibility—5.0%

The yarn dyed deeply and exhausted 3% dye-on-fibre dyebaths of the following acid dyes; giving washfast, bright shades.

| | |
|---|---|
| C.I. Acid Red 188, | C.I. Acid Green 25, |
| C.I. Acid Red 80, | C.I. Acid Blue 78, |
| C.I. Acid Orange 27, | C.I. Acid Red 30. |
| C.I. Acid Yellow 70, | |

EXAMPLE B

By contrast, an attempt to spin by the method of Example 13 a blend of the copolyamide prepared as described in Example 8 (80 parts), polyethylene terephthalate chip (1,000 parts) and polyethylene oxide (M.W. 20,000 (80 parts) failed since the mixture would not feed properly due to the low softening point and sticky melt-consistency of the polyethylene oxide.

We claim:

1. In a process for the preparation of fibres by forming an intimate mixture in the molten state of (a) a fibre-forming polyester or copolyester which has the ester units in the repeating polymer chain and is free from any polyalkyleneoxy groupings and (b) a fibre-forming polyamide or copolyamide having the amide units in the repeating polymer chain and a Viscosity Ratio as measured on a 1% solution in 90% formic acid at 25° C. of not less than 1.4, the component (b) being present to the extent of less than 50% by weight of the sum of (a) and (b), and then melt-spinning the mixture to form fibres, the improvement which comprises including in said molten mixture for melt-spinning and in intimate physical admixture with said components (a) and (b), a polyethylene oxide having a molecular weight of 6,000 to 20,000, said polyethylene oxide being present at a level of from 5 to 15% by weight of the sum of (a), (b) and said oxide, whereby the resulting fibres are characterized by substantially improved substantivity towards acid dyestuffs, such substantivity being resistant to scouring at temperatures of the order of 100° C.

2. A process according to claim 1 wherein the amount of component (b) is between 7.4% and 50%, based on the sum of components (a) and (b).

3. A process according to claim 1 wherein the polyester is poly(alkylene terephthalate) or the copolyester is a copolyester of poly(alkylene terephthalate).

4. A process according to claim 1 wherein (a) is polyethylene terephthalate and (b) is selected from the group consisting of poly(hexamethylene adipamide), a copolymer of
poly(hexamethylene adipamide) with
N-(2'-aminoethyl)piperazine,
poly(sebacoyl N-(2-aminoethyl)piperazine),
poly(sebacoyl N,N'-bis(3-aminopropyl)piperazine),
poly(adipoyl N,N'-bis(3-aminopropyl)piperazine),
poly(suberoyl N-(2-aminoethyl)piperazine),
a copolymer of caprolactam and N(2-aminoethyl piperazine adipate), a copolymer of caprolactam and N(2-aminoethyl)piperazine adipate, and copolymer of azelaic acid, hexamethylene diamine and N(2-aminoethyl)piperazine.

5. The process of claim 1 wherein the polyethylene oxide is present to the extent of 7–12% based on the total weight of the mixture.

6. Fibres of improved substantivity obtained from the process of claim 1.

7. A process according to claim 1 wherein the polyamide is first mixed with the polyethylene oxide in the molten state to form a dispersion of polyamide particles in the polyethylene oxide and said dispersion is thereafter mixed in the molten state with said polyester.

8. A melt-spinnable fiber-forming blend of a (a) a fibre-forming polyester or copolyester which has the ester units in the repeating polymer chain and is free from any polyalkyleneoxy groupings; (b) a fibre-forming polyamide or copolyamide having the amide units in the repeating polymer chain and a Viscosity Ratio as measured on a 1% solution in 50% formic acid at 25° C. of not less than 1.4, the component (b) being present to the extent of less than 50% by weight of the sum of (a) and (b), and in physical admixture with said components (a) and (b), a polyethylene oxide (c) having a molecular weight of 6,000 to 20,000, said polyethylene oxide being present at a level of from 5 to 15% by weight of the sum of (a), (b) and (c) whereby fibres melt-spun from said mixture are characterized by substantially improved substantivity toward acid dyestuffs, such substantivity being resistant to scouring at temperatures of the order of 100° C.

References Cited

UNITED STATES PATENTS

| | | | |
|---|---|---|---|
| 3,329,557 | 7/1967 | Magat et al. | 260—857 |
| 3,355,413 | 11/1967 | Kiefer | 260—857 |
| 3,378,055 | 4/1968 | Robertson | 260—857 |
| 3,378,602 | 2/1968 | Robertson | 260—857 |
| 3,381,058 | 4/1968 | Caldwell | 260—860 |
| 3,382,305 | 5/1968 | Breen | 260—857 |
| 3,386,967 | 6/1968 | Twilley | 260—857 |
| 3,355,413 | 11/1967 | Kiefen | 260—860 |

FOREIGN PATENTS

| | | |
|---|---|---|
| 610,140 | 10/1948 | Great Britain. |
| 956,833 | 4/1964 | Great Britain. |
| 623,762 | 4/1963 | Belgium. |
| 1,372,345 | 8/1964 | France. |
| 623,762 | 4/1963 | Belgium. |
| 1,372,345 | 8/1964 | France. |

OTHER REFERENCES

D. Coleman: Block Copolymers, Journal of Polymer Science, vol. 14, 15–28 (1954).

PAUL LIEBERMAN, Primary Examiner

U.S. Cl. X.R.

260—75, 78, 860